United States Patent [19]

Coulter

[11] Patent Number: 4,635,141

[45] Date of Patent: Jan. 6, 1987

[54] METHOD AND APPARATUS FOR STORING DATA ON MAGNETIC OR OPTICAL MEDIA

[75] Inventor: Douglas Coulter, Chantilly, Va.

[73] Assignee: United States Design Corporation, Lanham, Md.

[21] Appl. No.: 433,880

[22] Filed: Oct. 13, 1982

[51] Int. Cl.[4] ............................................. G11B 5/09
[52] U.S. Cl. ....................................... 360/44; 360/45
[58] Field of Search ..................... 360/44, 45, 25, 31

[56] References Cited

U.S. PATENT DOCUMENTS

| | | | |
|---|---|---|---|
| 3,281,806 | 10/1966 | Lawrance | 360/44 |
| 3,792,454 | 2/1974 | Lipp | 360/44 |
| 4,000,512 | 12/1976 | Lau | 360/44 |
| 4,142,215 | 2/1979 | Roberts | 360/45 |
| 4,245,263 | 1/1981 | Rathburn | 360/45 |
| 4,245,264 | 1/1981 | Allen | 360/45 |
| 4,373,154 | 2/1983 | Balme et al. | 360/44 |
| 4,426,667 | 1/1984 | Masher et al. | 360/44 |

Primary Examiner—Vincent P. Canney
Attorney, Agent, or Firm—Cushman, Darby & Cushman

[57] ABSTRACT

Method and apparatus for storing data on a recording medium wherein the method includes grouping digital binary signals into chunks of N bits where N is an integer greater than 1. The value of each of the N bit chunks is determined and converted into a symbol cell. Each symbol cell has a duration which is dependent upon the value of the corresponding N bit chunk. The symbol cell is recorded. The transition shift for each of a plurality of juxtapositions of symbol cells is determined, and the symbol cell duration is varied depending upon the compensation required from the determined transition shift. A system of reading out the recorded symbol cells is also disclosed.

34 Claims, 5 Drawing Figures

METHOD AND APPARATUS FOR STORING DATA ON MAGNETIC OR OPTICAL MEDIA

BACKGROUND OF THE INVENTION

This invention relates to a storage system for use in data processing systems and, more specifically, relates to an improved formatting scheme for encoding data for storage on magnetic or optical media.

In known tape or disc memory subsystems, information, whether it be in digital or analog form, is conventionally stored on the media in the form of bits of information. If the information is in the form of an analog signal, the signal is converted to a digital signal, usually in binary format and stored on a tape or disc by means of write heads. Digital input signals may be recorded directly on the magnetic media by means of the write heads. Data is recorded on optical media by other methods usually employing a laser "write head". Conventionally, digital data is recorded by using an FM format wherein a binary "one" requires two magnetic transitions per bit and a "zero" requires one transition per bit. Using this formatting scheme, the minimum bit length or duration is two minimum transition intervals. A minimum transition interval is the minimum space permitted between transitions and depends upon the recording system and reliability requirements therefor. For magnetic media, this minimum interval is determined by the minimum magnetic domain size which can be written and read back reliably. For optical media, the minimum interval is controlled by the spot size attainable, in a similar fashion. Another conventional formatting system is known as modified frequency modulation (MFM). In this format a binary "one" requires that a transition occur in the middle of a bit interval and a binary "zero" requires that a transition occur at the beginning of a bit interval. A common feature of these and other currently used formatting systems is that, at best, a minimum transition interval is required for each binary bit to be recorded.

While these known format schemes have worked well, a problem always confronting users of computer systems is the limited capacity of disc and tapes for storing information and the limited rate at which information thereon can be read into or out of a computer. Thus the cost of tapes and discs, the cost of physically locating and storing these memory units and the time involved in transferring the disc and tapes to and from the drive unit of a computer and reading information therefrom into a computer are expenses which users have tried to minimize.

Moreover, there are certain errors which are indigenous to magnetic memory systems. One example is that of magnetic bit shift wherein the spatial length of a stored bit will tend to grow in size with time by an amount which depends upon among other things, the transitions recorded before and after each bit transition. For example, if a relatively long transition period is followed and preceded by a short transition period, the long transition period will have a tendency to shrink or reduce its duration. On the other hand, a short transition period followed and preceded by a long transition period will tend to grow or lengthen with time. Techniques are known for limiting error due to such bit shift but each system known to applicant assumes a predetermined bit shift and adjusts the duration of each transition interval based upon the assumed bit shift. This method is not accurate and accordingly there is a need in the art for an improved system for compensating for the actual bit shift in a magnetic recording system.

This invention is designed to replace only the portion of a storage media controller generally referred to as the formatter or data encoder/separator.

As storage media controller technology and various embodiments thereof are well known to anyone versed in the art, no attempt is made herein to further describe them. It is further assumed for the purpose of this description that the invention described herein is utilized either with or as part of such a controller, and has available to it control and other signals normally provided to the formatter by the controller.

It accordingly is an object of this invention to provide an improved method and apparatus for recording digital information.

SHORT STATEMENT OF THE INVENTION

Applicant's invention is directed to an improved method and apparatus for storing digital information.

Input digital information in binary format is initially grouped into "chunks" of N bits. These "chunks" will be hereinafter referred to as symbols. Note that the size of the symbol alphabet, e.g. the number of symbols, is equal to $A^N$ where A is the size of the input alphabet (2 for binary) and N is the number of input symbols recorded (or mapped) into each output symbol. In accordance with the invention, a symbol cell is generated which has a duration which depends upon the value of the "chunk" of N bits. Thus, beginning at a reference transition or at the end of a previous symbol, a timer is started. The duration of the timer is defined as $T_{min} + nT_{sy}$ wherein $T_{min}$ is the minimum transition interval allowed for the read/write channel and $nT_{sy}$ is the extra time associated with the symbol cell desired to be written. $T_{sy}$ is an incremental time duration and typically ranges from 1% to 10% of $T_{min}$. $nT_{sy}$ is uniquely defined by the value of the N bit "chunk". For example, if N is 3, i.e., three input binary bits, eight levels of values are uniquely identified by the three binary bits. Thus, $nT_{sy}$ will equal one of eight time durations dependent upon the value of the data "chunk". Thus each N-bit "chunk" is converted to a pulse width modulated signal termed a symbol cell, having a time duration which depends upon the value n of the N-bit "chunk".

The pulse width modulated signal is stored on a magnetic or optical media and read therefrom by the reverse process of detecting the length of each symbol cell and depending upon the time duration thereof, a value of a corresponding N-bit "chunk" of data is determined. A decoder will then generate N-bits having binary values which correspond to the value of the N-bit "chunks". Thus, unlike current methods, the invention allows the encoding of an N-bit symbol on each successive transition. The improvement in storage density compared to a conventional system that requires one $T_{min}$ per bit is $$N \frac{T_{min}}{nT_{sy} \text{ (average)} + T_{min}}$$

or slightly less than N if $T_{sy}$ is chosen to be small compared to $T_{min}$.

It should be noted that the length of a record of data will vary depending upon the contents of the record. For non-fixed-format devices, such as tapes, this presents no difficulty. However, for fixed track-length devices, such as disks, it is undesirable to reserve the maximum (worst case) length for each record, as this will negate some of the density improvements. Therefore, for fixed track length devices, the invention incorporates a simple symbol re-mapping. As data is input for storage, information is gathered on the relative symbol frequencies of occurrence (symbol histogram). Based on this information a translation table is created. This table assigns the most frequently occurring input symbol to the shortest ($T_{min}$) output symbol, the next most frequent symbol to the next shortest output, etc. This table (in untranslated form) is then sent along with the data to be written to facilitate decoding.

This invention also includes an adaptive compensation system wherein a header is generated for each track of the tape, disc or other magnetic media. The header includes a test pattern which preferably includes all possible combinations of three successive symbols. The test pattern is for the purpose of testing transition shift when the pattern is recorded onto the magnetic media and read therefrom. The duration of each symbol recorded is known and is compared with the duration of the symbol as recovered from the media. Based upon the detected bit shift, a data precompensation table is generated. In the simplest case, the duration of the recovered symbol is compared with the desired duration for that symbol. If the recovered symbol is too short, an arbitrarily small time increment (less than $T_{sy}$) is added to the duration stored for that symbol in the precompensation table. Conversely, if the recovered symbol duration is longer than desired, a small amount is substracted from the duration stored for the symbol in question. This simple scheme would work if transition shift were independent of adjacent transitions. It is not, however, and in practice it is necessary to measure the transition shift for a symbol in the context of at least one each of the preceeding and following symbols, as the placement of these adjacent transitions is the dominant factor in determining transition shift, other parameters being equal. Therefore, instead of storing a single duration for each symbol, the precompensation table must contain at least $$\frac{n(n-1)}{2}$$

durations, n being the number of symbols in the alphabet. In practice, this will usually be done using $n^2$ durations per symbol, as this configuration simplifies the design considerably at a very small cost due to increased table size. It is for this reason that the test pattern should contain all combinations of three successive symbols, so the effect of adjacent transitions may be accurately measured and compensated. Transition shift is thus determined and appropriate compensation values are generated and stored in the precompensation table. The test pattern may then be rerecorded using the new precompensation table.

This process of writing a test pattern, reading it back, and updating the precompensation table may be repeated or iterated until the desired accuracy is achieved. Once this accuracy is achieved, the precompensation table may be stored in the header along with the test pattern for use in later recording on that track. The system is adaptive because it measures and corrects the bit shift actually present on the recording device in use.

The nature of the invention makes it applicable to any recording device where the resolution with which a transition or spot can be placed is better than the minimum transition to transition interval.

Apparatus for implementing the aforementioned storage format is described hereinbelow.

BRIEF DESCRIPTION OF THE DRAWINGS

Other objects features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
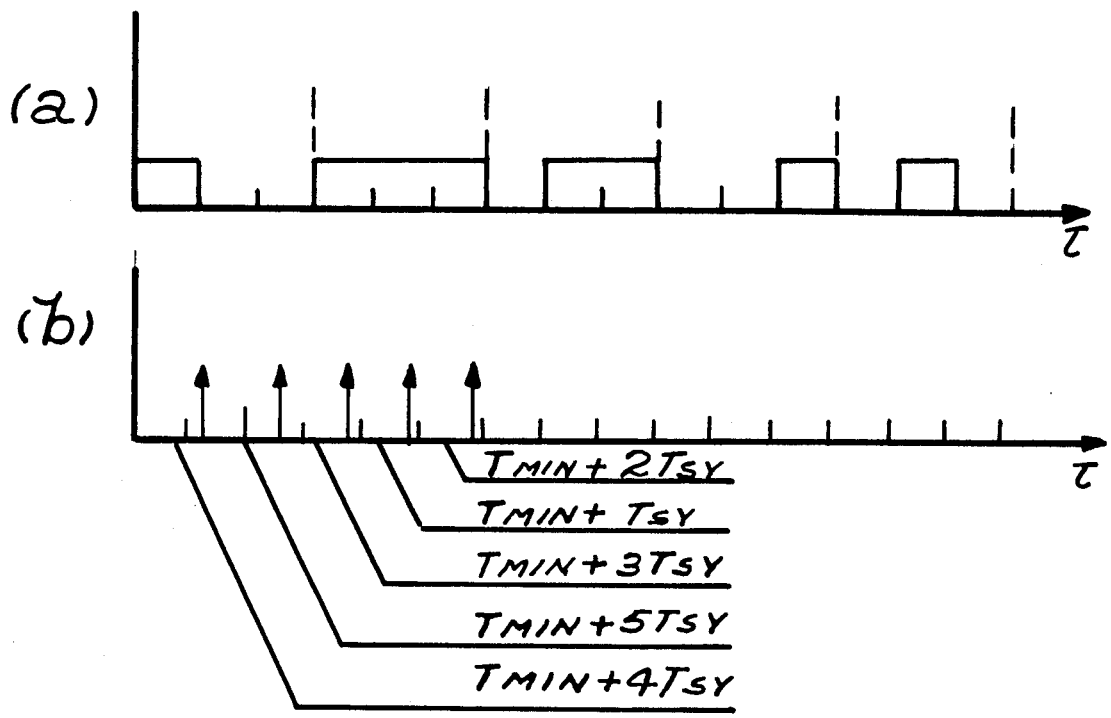
FIG. 1 consisting of (a) and (b), is an illustration of a binary input signal and the associated symbol cell train in accordance with the present invention.

A typical input signal to a magnetic tape or disc recording system is illustrated in FIG. 1(a). In the past, there have been several formats for recording the respective bits of a signal onto a magnetic media. Each of these formats requires one or more transitions per bit, i.e., reversals of flux or optical spots per bit. However in accordance with the present invention, it is desired to compress the information contained in the bit stream into a smaller amount of space or into a shorter time duration so that a substantially increased amount of information can be recorded in any given length of media. In order to achieve this, N bits of the input information signal are grouped together in "chunks" and encoded on a single transition. Assume for example that the number N is three. The input information illustrated in FIG. 1(a) is grouped into "chunks" of three bits as illustrated by the dotted lines. Since three bits of binary information define eight different levels, if the duration of each three bit "chunk" could be reduced to a duration in the neighborhood of the minimum transition time, it can be seen that up to almost three times as much data could be recorded in a given length of media.

Figure 2:
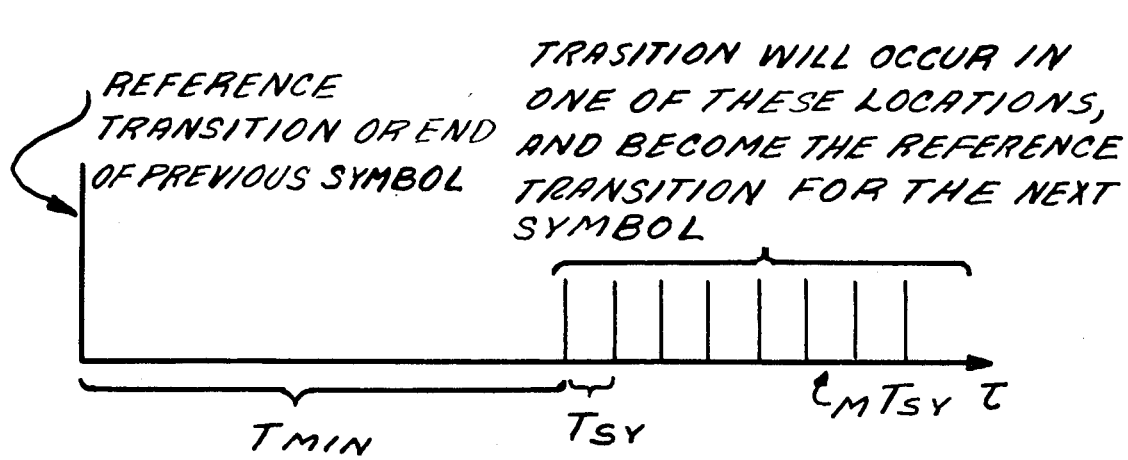
FIG. 2 is the format of a symbol cell in accordance with the present invention.
Figure 3:
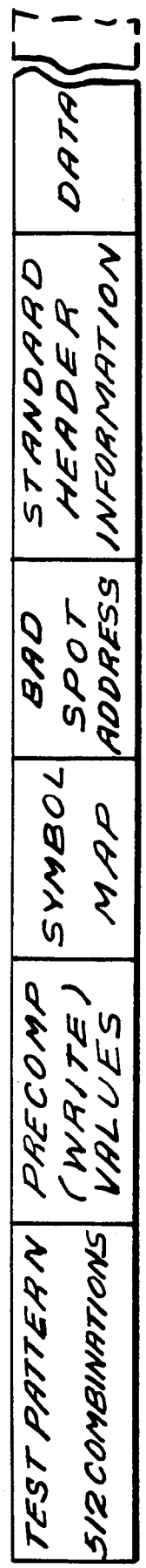
FIG. 3 is a format for the header for each track of the media.

Refer now to FIG. 2 where there is illustrated, in expanded form, the format of a symbol cell in accordance with the present invention wherein the symbol cell corresponds to an N bit chunk of input data. The symbol cell comprises a first time duration $T_{min}$ which is the minimum transition interval allowed by a particular read/write channel for a given storage system. The value of $T_{min}$ can be varied depending upon the amount of bit shift permitted and/or the extent of compensation used to correct for bit shift. Following the interval $T_{min}$ is a discrete interval $T_{sy}$ or a multiple thereof. $T_{sy}$ is the extra time associated with the symbol cell which depends upon the value of the set of N bits of input data. For example, if the value of the N bits of information represented by a symbol cell of data is zero, and no symbol mapping is used, then $T_{sy}$ would equal zero. If the value of the N bits is equal to one, then the duration of the symbol cell would be $T_{min}+T_{sy}$. If the value of the N bits is two, the duration of the symbol cell would be $T_{min}+2T_{sy}$ and so on. Assuming that the input data is grouped into "chunks" of three bits, i.e., N equals three, then the maximum duration of the symbol cell would be $T_{min}+7T_{sy}$. The value of a discrete interval $T_{sy}$ can range from, for example, 3% up to 10% of the duration of $T_{min}$. It should be appreciated that $T_{min}$, which is typically for present day magnetic media, 250 ns could be reduced to other values such as 100 ns. Alternatively if the time interval $T_{min}$ is enlarged, the intervals $T_{sy}$ could be made relatively much smaller such as 1% or less of $T_{min}$.

Refer now to FIG. 1(b) which shows the format of the stored symbol cells in accordance with the present invention which correspond to the input signal of FIG. 1(a). The input data of FIG. 1(a) is fifteen bits long and thus would take a time interval of approximately 15 $T_{min}$ to record with conventional modified frequency modulation. However, the compressed data of FIG. 1(b) has a time duration of only 5 $T_{min}$ plus 18 $T_{sy}$. If, for example, $T_{sy}$ is 5% of $T_{min}$, then the total length of the compressed signal would be about 5.9 $T_{min}$. It can be seen that the input data has been compressed to a much shorter period and space length, i.e. a length reduced by a factor of 2.54 over that of FIG. 1(a).

It can be appreciated that the reduction of required space depends upon the relative values of the data stored and accordingly upon the duration of the symbols recorded. For example, if all zeros are recorded, the timed duration of each symbol cell would be equal to $T_{min}$ which would result in a reduction of the track length required for a given set of data by a factor of three. However, if all ones were recorded it would take 1.35 times as long to record a sector of all ones as it would to record a sector of all zeros assuming that $T_{sy}$ is 5% of $T_{min}$. This would result in a reduction of track length by a factor of 2.22 instead of 3. In order to overcome this problem and to minimize the track length required for a given amount of information stored, a symbol map is generated. To do this the data to be written on the medium is grouped into N bit "chunks" and a histogram of the values of the N bit "chunks" is generated. Based upon the histogram, the shortest symbol, i.e., $T_{min}$ +0, is assigned to the most frequently occurring input group and so on in descending order. In the worst case, when the value of the input signal is random, i.e. all histogram entries occur with equal frequency, the average bit length of each symbol cell being recorded would be about 1.2 $T_{min}$ when N equals three. Thus, the increase in the effective bit storage under this worst case circumstance would be about 2.5. Accordingly, by utilizing pulse width modulation techniques, applicant has discovered how to reduce the amount of memory media required to record a given amount of data.

As aforementioned, there is some degree of transition shift when data is recorded on a magnetic recording medium. The amount of transition shift depends primarily upon the proximity of previous and next transitions. It is desirable to have proximity of adjacent transitions, and accordingly, write precompensation is necessary to minimize errors due to transition spread particularly in view of the fact that the present invention relies upon pulse width modulation in order to achieve data compression for storage purposes.

In order to provide compensation for transition shift, an adaptive system has been devised by applicant for determining the appropriate amount of compensation required. A test pattern having, in the preferred embodiment, at least 512 possible combinations of symbol sets is written onto the tape or disc header. The test pattern is formatted such that each of the 512 combinations includes three values, wherein each of the values ranges from zero to seven. The first value represents the preceeding value in a stream of data values. The next value represents the current value and the last value represents the next succeeding value. These values are stored on the tape and represent most of the possible combinations of values which would occur in a system having N equal 3 bits grouped into "chunks". Next, a precompensation table is written onto the tape or disc having 512 different values corresponding to the compensation required to correct bit shift for the 512 combinations of the test pattern. However, initially there are no compensation values written into the header but rather, as will be seen, the precompensation values will be determined as the test pattern is read to determine the occurrence of bit shift for any given one of the 512 combinations recorded in the test pattern. Next a symbol map is recorded in the header of the disc or tape which, as aforementioned, is the key to determining what the respective values of the symbol cells are as they are read from the storage media. Next the track address is written on the header in a manner known in the art and other items conventionally required in the header of a disc or tape are recorded. Next, the address of bad spot locations on the disc or tape are recorded and finally the data to be stored is written onto the tape or disc.

Compensation for bit shift in accordance with the present invention assumes that the oscillator for generating the transition signals and the disc speeds are constant during a revolution or data record. In practice, the disc speed is constant to greater than a 1% accuracy. If the oscillator is locked to the disc speed, then any remaining variations in disc speeds will be tracked by the oscillator thereby eliminating error due to the variation in the oscillator with respect to the speed of the disc. In tape systems, there is a substantial amount of speed variation and in order to eliminate variations in symbol cell duration on tape because of speed variation, a clock track is recorded on the tape which is tracked by the oscillator, and this clock is utilized when reading the stored information on the tape to insure that variations of speed have not resulted in a variation of apparent symbol cell length.

After the test pattern has been written onto the header of the tape or disc, on the next cycle the test pattern is read and a determination is made as to how much a bit shift has occurred with respect to each of the 512 combinations of values stored in the test pattern. Then for each combination a precompensation value is generated by which the duration of a symbol cell is either shortened or expanded depending upon the amount and type of transition shift encountered in the test pattern. Using the precompensation values, a new test pattern is written for each of the 512 combinations wherein the test pattern is adjusted to compensate for the transition shift. Again, the new test pattern is read and compared with the original test pattern to see if any transition shift remains. If there remains any significant transition shift, a second set of precompensation values are generated which more closely approximate that required for eliminating the unwanted effects of bit shift. This iterative process continues until precompensation values have been generated which eliminate any measurable error due to short-term transition shift.

When this occurs data is ready to be written onto the disc or tape.

Figure 4:
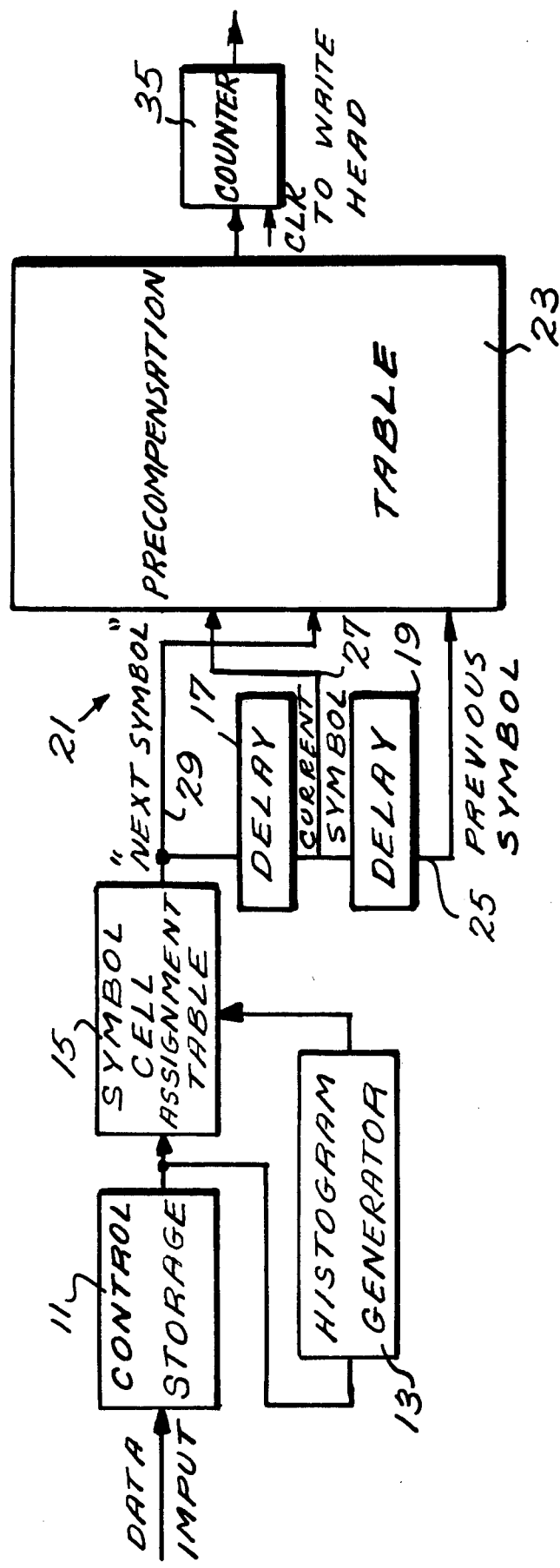
FIG. 4 is a simplified schematic illustration of the improved recording apparatus of the present invention.

Refer to FIG. 4 where there is illustrated a simplified functional block diagram of the system of the present invention for writing data onto a magnetic media. Input digital data is coupled to a control storage unit 11. Preferably, the storage unit is a low capacity, temporary storage capable of storing sufficient data to constitute a track of a disc or a tape. Assuming that N is equal to three, the data is stored in the controller memory 11 in the form of groups of three bits of data per group. The frequency of occurrence of each of the groups of data stored in the controller memory 11 is accumulated in a histogram generator 13. The histogram generator 13 builds up a histogram of values for each of the groups of data stored in the memory 11. Thus, the histogram generator 13 will determine what value for the groups of data stored in the memory 11 are the most common, the second most common, etc. From this a numeric value is assigned to each of the levels defined by each group of data in the memory by the symbol assignment generator 15. For example, if the groups of data in memory 11 are stored in groups of three, there will be eight possible levels stored. Assume now that the number 5 is the most frequently occurring value stored in the memory 11. Since the time value $nT_{sy}=0$ is the shortest time interval for a symbol cell, this value of $nT_{sy}$ is assigned to all bit groups or "chunks" of input data having the value 5. Assume that the least frequently occurring value in memory 11 is two. Then the symbol assignment generator 15 will assign a value of seven for $T_{sy}$. This, of course, is the longest symbol length and would be applied to the least frequently occurring input value. By this technique the length of storage media required for a given amount of input data, after being converted to a symbol cell by the aforementioned pulse width modulation process, is biased toward the shortest length possible.

The aforementioned process of assigning values to input data "chunked" into groups of three bits is illustrated in functional form only. It should be appreciated that the aforementioned process can in practice be achieved by means of either hardwired circuitry or preferably in an appropriately programmed general purpose computer.

If it were not for bit shift, the assigned values for each symbol cell could be directly recorded onto the magnetic media and, indeed, if that data is stored on an optical media, the symbol cells could be directly recorded. However, because bit shift occurs in magnetic media, the data must be processed further in order to achieve the appropriate precompensation for bit shift. To achieve this, the duration of the symbol cell to be recorded on each side of each symbol cell must be determined. This will determine how much precompensation is required for each symbol cell. The output of the symbol cell assignment generator 15 is therefore coupled to a set of shift registers 17 and 19. The shift registers 17 and 19 act as delay lines and accordingly when a first value for a first symbol is coupled to the precompensation system generally defined by the numeral 21, it is stepped through shift register 17 and shift register 19. The output of shift register 19 is coupled to a precompensation table 23. The next value for a symbol is coupled to the shift register 17 and at the output thereof is coupled to the precompensation table 23. The next value from the symbol cell assignment block is coupled directly to the precompensation table 23. Thus, on input line 25 there is a value which corresponds to the previous value recorded onto the media. On line 27 is the current value to be recorded onto the media and on line 29 is the next succeeding value to the recorded onto the media. Thus, appearing on lines 25, 27 and 29 respectively are the preceeding, current and next values to be stored. Knowing these respective values, the precompensation table 23 can look up the appropriate compensation required for the current value on line 27.

As aforementioned the process of computing the precompensation values for the data to be written onto the tape is done by an iterative process. The resulting precompensation table was then recorded in the header. When it is desired to record data, this header is read in first, and the write precompensation table is filled with appropriate values previously computed for that particular track of the media.

At the output of the precompensation table 23 the value of the symbol cell, appropriately compensated, is coupled to down counter 35. The counter 35 is clocked by the system clock and dependent upon the value coupled from table 23, it will count for a time period corresponding to the duration of $T_{min}+nT_{sy}$ adjusted for expected transition shift. When the downcounter 35 reaches a count of zero, a pulse is outputted which is used to write a transition (or spot) on the recording media. Thus, the output of the downcounter establishes the time duration of a symbol cell. In practice two downcounters must usually be provided wherein the downcounters operate alternatively so that as each downcounter generates an output indicating the end of the downcount, the next downcounter immediately begins counting down for the next symbol cell to be recorded on the magnetic media.

Figure 5:
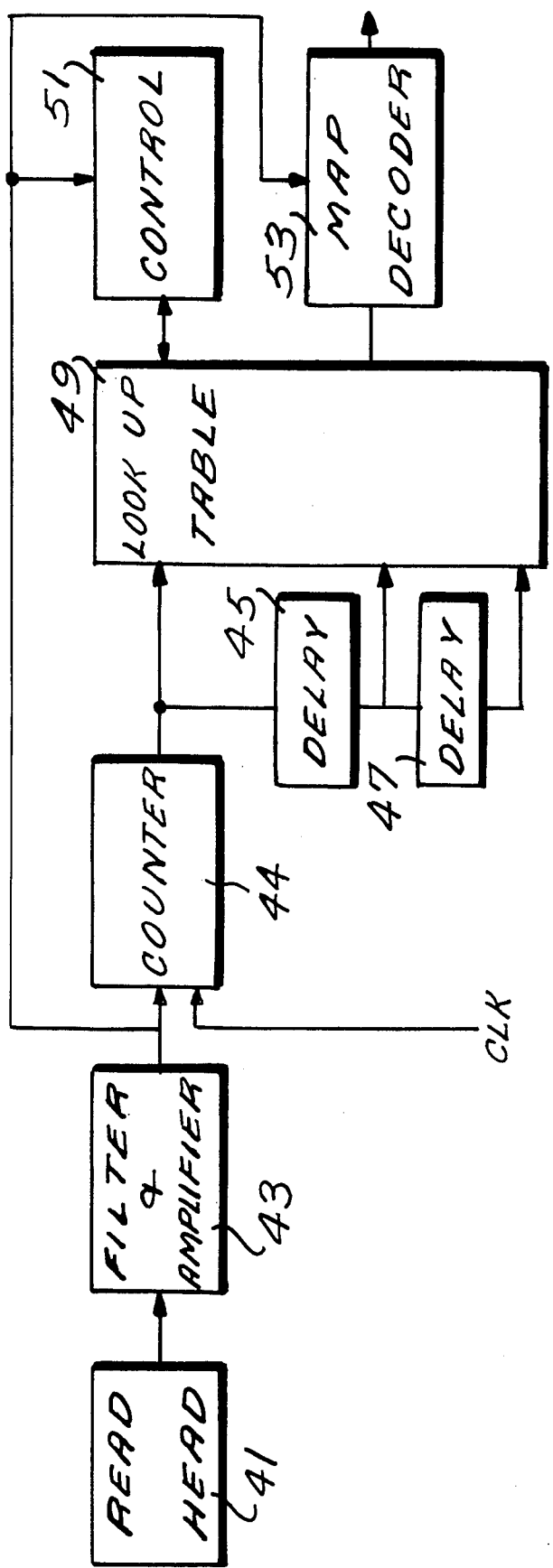
FIG. 5 is a simplified schematic illustration of the improved reading apparatus of the present invention.

Turn now to FIG. 5 where there is illustrated a functional block diagram of the system for reading data from the magnetic recording media in accordance with the present invention. A conventional read head 41 reads the data recorded on the magnetic media. This data is filtered, amplified and coupled to a comparator which converts the analog signal into digital levels compatible with the remaining logic. These components are of conventional design and are illustrated in FIG. 5 by block 43. The output of the comparator is then coupled to a counter 44, which counts the duration of each symbol cell. If desired, the counter could be set to subtract the time duration $T_{min}$ for each symbol cell since this value will be a constant for all symbol cells. For example, if the time period $T_{min}$ is 120 ns and the clock interval is 3 ns then forty clocks or counts could be subtracted from the output of the counter before using it. The output of the counter is an eight bit, binary signal which defines the length or duration of the symbol cell or the symbol cell minus the period $T_{min}$. This count signal is coupled to a shift register arrangement including a first shift register 45 and a second shift register 47. The shift registers act as delay lines as in the writing system of FIG. 4. The three most significant digits at the output of the shift register 47 are coupled to a lookup table 49. This number corresponds to the previously read symbol cell. All eight digits of the output of shift register 45 are coupled to the look-up table. This signal corresponds to the duration of the current symbol cell being read from the recording media. Finally, the three most significant digits at the output of the counter 44 are coupled directly to the look-up table 49. These digits correspond to the "next" symbol duration read from the media. The "previous" and "next" symbol durations are shortened to their three most significant digits mainly to reduce the required size (number of address bits) of lookup table 49.

Before data reading can commence, lookup table 49 must be filled with the appropriate values to decode the transition intervals. This is accomplished in the following manner. The control circuit 51 is capable of generating the same sequence of symbols (or chunks) used to create the test pattern. As the test pattern is being read from the media, control circuit 51 generates the values known to be contained in the test pattern, in the same order and in synchronism therewith, and presents these to the data port of lookup table 49, while the previous, current, and next interval lengths are presented to the address port. As each transition arrives, the appropriate symbol is thereby mapped onto the appropriate interval by writing the symbol into the table at the location determined by the interval actually read, thus compensating for transition shift or speed variation which has occurred since the data were written.

After the test pattern has been used to place the appropriate values into the lookup table, control circuit 51 places the table into the "read" mode. In this mode, the previous, current, and next transition interval values address the table, and the table outputs the symbol value known to correspond to the "current" interval, when it is preceded and followed by the specific intervals stored on the media. The value stored in the addressed location of memory is then coupled to a map decoding system 53 wherein the actual value of a three bit "chunk" is determined based upon the assigned values in the map decoder 53. The input to the map decoder is derived from the header and is read directly from the storage medium. At the output of the map decoder, a three bit chunk is generated dependent upon the value of the decoded symbol cell. This data is then coupled to an appropriate utilization device.

It should be noted that this read compensation scheme is entirely separate from that used to precompensate the data before writing on the media, and may be used without the write precompensation in some cases. It, too, however, is adaptive, as it compensates for the transition shift actually encountered on the media at the time and location of the reading, rather than being based on a prediction of what the transition shift might be, as in current systems.

While the aforementioned invention has been disclosed in connection with a preferred embodiment thereof, it should be appreciated that other modifications and embodiments may be developed that fall within the spirit and scope of the invention as defined by the appended claims.

What is claimed is:

1. A method of storing data on a recording medium comprising the steps of:
   grouping digital binary signals into chucks of N bits wherein N is an integer number greater than 1;
   determining the value of each of N bit chunks;
   converting said N bit chunks to a corresponding symbol cell, each of said symbol cells having a duration which is dependent upon the value of the corresponding N bit chunk and which is equal to the sum of the minimum transition period for the recording medium and an incremental time period, said incremental time period being directly proportional to the value of said N bit chunk, the maximum duration of said incremental time period being less than the time duration of the minimum transition period; and
   recording said symbol cells onto a recording medium.

2. The method of claim 1 wherein N is equal to 3.

3. A method of storing data on a recording medium comprising the steps of:
   grouping binary input signals into chunks of N bits wherein N is an integer number greater than 1;
   determining the values of each of said N bit chunks;
   determining the relative frequency of occurrence of each of the values of said N bit chunks;
   assigning a symbol cell duration to each of said N bit chunks wherein the more frequently a value occurs, the shorter is the time duration assigned to the symbol cell;
   generating symbol cells for each N bit chunk in accordance with the symbol cell duration assigned thereto; and
   recording said symbol cells onto a recording medium.

4. The method of claim 3 wherein said symbol cells each have a duration equal to the sum of the minimum transition period for the recording medium and an incremental time period, said incremental time period being inversely proportional to the frequency of occurrence of the values of said N bit chunks, the maximum duration of said incremental time period being less than the time duration of the minimum transition period.

5. The method of claim 4 wherein N is equal to 3.

6. A method of storing data on a recording medium comprising the steps of:
   grouping binary signals into chunks of N bits wherein N is an integer greater than 1;
   determining the value of each of said N bit chunks;
   converting said N bit chunks to a corresponding symbol cell, each of said symbol cells having an assigned duration which is dependent upon the value of the corresponding N bit chunk;
   recording on a portion of said medium the relative symbol cell juxtapositions for at least two successive symbol cells;
   determining from said recorded symbol cell juxtapositions the transition shift for each of said juxtapositions of symbol cells; and
   adaptively precompensating for said transition shift by varying the duration of said symbol cells before recording.

7. A method of storing data on a recording medium comprising the steps of:
   grouping binary signals into chunks of N bits wherein N is an integer greater than 1;
   determining the values of each of said N bit chunks;
   determining the relative frequency of occurrence of each of the values of said N bit chunks;
   assigning a symbol cell duration to each of said N bit chunks wherein the more frequently a value occurs, the shorter is the time duration assigned to the symbol cell;
   generating symbol cells for each N bit chunk in accordance with the symbol cell duration assigned thereto;
   recording on a portion of said medium the relative symbol juxtaposition for at least two successive symbol cells;
   determining from said recorded symbol cell juxtapositions the transition shift for each of said juxtapositions of symbol cells; and adaptively precompensating for said transition shift by varying the duration of said symbol cells before recording.

8. The method of storing data on a recording medium of either claim 6 or 7 wherein said symbol cell has a duration equal to the sum of the minimum transition period for the recording medium and an incremental time period, said incremental time period being inversely proportional to the frequency of occurrence of the values of said N bit chunks, the maximum duration of said incremental time period being less than the time duration of the minimum transition period.

9. A method of storing data in a recording medium comprising the steps of:
grouping binary signals into chunks of N bits wherein N is an integer greater than 1;
determining the value of each of said N bit chunks;
converting said N bit chunks to a corresponding symbol cell, each of said symbol cells having an assigned duration which is dependent upon the value of the corresponding N bit chunk;
recording on a portion of said medium the relative symbol cell juxtapositions for a plurality of successive symbol cells;
determining from said recorded symbol cell juxtapositions the transition shift for each of said juxtapositions of symbol cells;
modifying the duration of said symbol cells to compensate for said determined transition shift; and
recording said symbol cells onto a recording medium.

10. The method of claim 9 further comprising the steps of determining the relative frequency of occurrence of each of the values of said N bit chunks;
assigning a symbol cell duration to each of said N bit chunks wherein the more frequently a value occurs, the shorter is a timed duration assigned to the symbol cell; and
generating symbol cells for each N bit chunk in accordance with the symbol cell duration assigned thereto.

11. A method of storing data on a recording medium comprising the steps of:
grouping digital binary signals into chunks of N bits, wherein N is an integer number greater than 1;
determining the value of each of said N bit chunks;
converting said N bit chunks to a corresponding symbol cell, each of said symbol cells having a duration which is dependent upon the value of the corresponding N bit chunk;
recording a plurality of different symbol juxtapositions onto a magnetic medium;
determining from said recorded symbol cell juxtapositions the transition shift for each of said juxtapositions of symbol cells;
compensating said symbol cells for transition shift by varying the duration thereof; and
recording said compensated symbol cells corresponding to said N bit chunks onto a recording medium.

12. The method of claim 11 wherein each precompensated symbol cell has a duration equal to the sum of the minimum transition period for the recording medium and an incremental time period, said incremental time period being directly proportional to the value of said N bit chunks, the maximum duration of said incremental time period being less than the time duration of the minimum transition period.

13. The method of claim 11 or 12 further comprising the step of determining the relative frequency of occurrence of each of the values of said N bits chunks;
assigning a symbol cell duration to each of said N bit chunks wherein the more frequently a value occurs, the shorter is the time duration assigned to the symbol cell; and
generating symbol cells for each N bit chunk in accordance with the symbol cell duration assigned thereto.

14. The method of claim 11 wherein said compensating step further comprises the step of successively rerecording said plurality of bit juxtapositions and determining said transition shift therein until said transition shift is reduced to an acceptable level; and recording symbol cells of data onto said recording medium by precompensating said bits in accordance with the determined transition shift of said plurality of bit shift juxtapositions.

15. A method of storing data on a recording medium comprising the steps of:
grouping binary signals into chunks of N bits wherein N is an integer greater than 1;
determining the value of each of said N bit chunks;
converting said N bit chunks to a corresponding symbol cell, each of said symbol cells having an assigned duration which is dependent upon the value of the corresponding N bit chunks;
recording on a portion of said medium the relative symbol cell juxtapositions for three successive symbol cells;
determining from said recorded symbol cell juxtapositions the transition shift for each of said juxtapositions of symbol cells;
compensating said symbol cells for transition shift by varying the duration of said symbol cells;
repeating said recording, determining and compensating steps until said transition shift has been compenstated; and
compensating symbol cells to be stored for transition shift by varying the duration of said symbol cells in accordance with the determined transition shift of juxtaposed symbol cells.

16. A method of compensating for transition shift in a magnetic storage medium comprising the steps of:
recording on a portion of said magnetic medium a plurality of different bit juxtapositions;
recording the order in which said plurality of relative bit juxtaposition are recorded;
reading from said medium the order in which said bit juxtapositions are recorded;
reading from said medium the plurality of different bit juxtapositions;
determining the level of transition shift for each of said plurality of different bit juxtapositions;
reading data stored on said medium; and
compensating said read data bits for transition shift by varying the duration of said symbol cells in accordance with said determined transition shift.

17. A method of storing data on a recording medium comprising the steps of:
grouping digital binary signals into chunks of N bits, wherein N is an integer number greater than 1;
determining the value of each of said N bit chunks;
converting said N bit chunks to a corresponding symbol cell, each of said symbol cells having a duration which is dependent upon the value of the corresponding N bit chunk; and recording on a portion of said magnetic medium a plurality of relative symbol cell juxtapositions;
recording the order in which said plurality of relative symbol cell juxtapositions are recorded;
reading from said medium the order in which said symbol cell juxtapositions are recorded;
reading from said medium the plurality of symbol cell juxtapositions;
determining the level of transition shift for each of said plurality of symbol cell juxtapositions;
reading data stored in a form of said symbol cells from said medium; and
compensating said read data symbol cells for transition shift by varying the duration of said symbol cells in accordance with said determined said transition shift.

18. The method of claim 17 wherein said symbol cell has a duration equal to the sum of the minimum transition period for the recording medium and an incremental time period, said incremental time period being directly proportional to the value of said N bit chunk, the maximum duration of said incremental time period being less than the time duration of the minimum transition period.

19. The method of claim 17 or 18 further comprising the steps of determining the relative frequency of occurrence of each of the values of said N bit chunks;
assigning a symbol cell duration to each of said N bit chunks wherein the more frequently a value occurs, the shorter is the time duration assigned to the symbol cell; and
generating symbol cells for each N bit chunk in accordance with the symbol cell duration assigned thereto.

20. A method of storing data on a recording medium comprising the steps of:
recording a plurality of different bit juxtapositions onto a magnetic medium;
determining from said recorded bit juxtapositions the transition shift for each of said juxtapositions of bits;
compensating said bits for transition shift by varying the duration thereof;
recording bits of data on said recording medium by precompensating said bits in accordance with the determined transition shift of said plurality of bits shift juxtapositions;
recording the order in which said plurality of different bit juxtapositions are recorded onto said magnetic medium;
reading from said medium the order in which said bit juxtapositions are recorded;
reading from said medium the plurality of recorded bits of data;
determining the level of transition shift for each of said plurality of different bit juxtapositions;
reading said recorded bits of data from said medium; and
compensating said read data bits for transition shift by varying the duration of said bits in accordance with said determined transition shift.

21. A method of storing data on a recording medium comprising the steps of:
grouping ditigal binary signals into chunks of N bits, where N is an integer greater than 1;
determining the value of each of said N bit chunks;
converting said N bit chunks to a corresponding symbol cell, each of said symbol cells having an duration which is dependent upon the value of the corresponding N bit chunks;
recording on a portion of said medium the relative symbol cell juxtapositions for at least two successive symbol cells;
determining from said recorded symbol cell juxtapositions the transition shift for each of said juxtapositions of symbol cells;
compensating said symbol cells for transition shift by varying the duration of said symbol cells;
recording on a portion of said magnetic medium a plurality of relative symbol cell juxtapositions wherein said symbol cells are precompensated to reduce transition shift distortion;
recording the order in which said plurality of relative symbol cell juxtapositions are recorded;
reading from said medium the order in which said symbol cell juxtapositions are recorded;
reading from said medium the plurality of symbol cell juxtapositions;
determining the level of transition shift for each of said pluality of said symbol cell juxtapositions;
reading data stored in the form of said symbol cells from said medium; and
compensating said read data symbol cells for transition shift by varying the duration of said symbol cells in accordance with said determined transition shift.

22. The method of claim 21 further comprising the steps of determining the relative frequency of occurence of each of the values of said N bit chunks;
assigning a symbol cell duration to each of said N bit chunks wherein the more frequently a value occurs, the shorter is the time duration assigned to the symbol cell;
generating symbol cells for each N bit chunk in accordance with the symbol cell duration assigned thereto; and wherein said compensated read data symbol cells are converted back to N bit chunks corresponding to said grouped digital binary signals.

23. A system of storing data on a recording medium comprising:
means for grouping digital binary signals into chunks of N bits wherein N is an integer number greater than 1;
means for determining the value of each of said N bit chunks;
means for converting sain N bit chunks to a corresponding symbol cell, each of said symbol cells having a duration which is dependent upon the value of the corresponding N bit chunk, and having a duration equal to the sum of the minimum transition period for the recording medium and an incremental time period, said incremental time period being directly proportional to the value of said N bit chunks, the maximum duration of said incremental time period being less than the time duration of the minimum transition period; and
means for recording said symbol cells onto a recording medium.

24. The system of claim 23 wherein N is equal to 3.

25. A system of storing data on a recording medium comprising:
means for grouping binary input signals into chunks of N bits wherein N is an integer number greater than 1;

means for determining the value of each of said N bit chunks;

means for determining the relative frequency of occurrence of each of the values of said N bit chunks;

means for assigning a symbol cell duration to each of said N bit chunks wherein the more frequently a value occurs, the shorter is the time duration assigned to the symbol cell;

means for generating symbol cells for each N bit chunk in accordance with the symbol cell duration assigned thereto; and means for recording said symbol cells onto a recording medium.

26. The system of claim 25 wherein said symbol cells have a duration equal to the sum of the minimum transition period for the recording medium and an incremental time period, said incremental time period being directly proportional to the value of said N bit chunk, the maximum duration of said incremental time duration being less than the time duration of the minimum transition period.

27. A system for storing data on a recording medium comprising:

means for grouping binary signals into chunks of N bits wherein N is an integer greater than 1;

means for determining the value of each of said N bit chunks;

means for converting said N bit chunks to a corresponding symbol cell, each of said symbol cells having an assigned duration which is dependent upon the value of the corresponding N bit chunks;

means for recording on a portion of said medium the relative symbol cell juxtapositions for three successive symbol cells;

means for determining from said recorded symbol cell juxtapositions the transition shift for each of said juxtapositions of symbol cells;

means for compensating said symbol cells to be stored for transition shift by varying the duration of said symbol cells in accordance with the determined transition shift of juxtaposed symbol cells.

28. The system of claim 27 wherein N equals 3.

29. A system for storing data on a recording medium comprising:

means for grouping binary signals into chunks of N bits wherein N is an integer greater than 1;

means for determining the value of each of said N bit chunks;

means for converting said N bit chunks to a corresponding symbol cell, each of said symbol cells having an assigned duration which is dependent upon the value of the corresponding N bit chunk;

means for recording on a portion of said medium the relative symbol cell juxtapositions for at least two successive symbol cells;

means for determining from said recorded symbol cell juxtapositions the transition shift for each of said juxtapositions of symbol cells; and means for adaptively precompensating for said transition shift by varying the duration of said symbol cells before recording and means for recording said symbol cells corresponding to said input data.

30. A system of storing data on a recording medium of claim 29 further comprising:

means for determining the relative frequency of occurrence of each of the values of said N bit chunks;

means for assigning a symbol cell duration to each of said N bit chunks wherein the more frequently a value occurs, the shorter is the time duration assigned to the symbol cell; and means for generating symbol cells for each N bit chunk in accordance with the symbol cell duration assigned thereto.

31. A system for storing data on a recording medium comprising:

means for grouping digital binary signals into chunks of N bits wherein N is an integer number greater than 1;

means for determining the value of each of said N bit chunks;

means for converting said N bit chunks to a corresponding symbol cell, each of said symbol cells having duration which is dependent upon the value of the corresponding N bit chunk;

means for recording on a portion of said magnetic medium a plurality of relative symbol cell juxtapositions;

means for recording the order in which said plurality of relative symbol cell juxtapositions are recorded;

means for reading from said medium the order in which said symbol cell juxtapositions are recorded;

means for reading from said medium the plurality of symbol cell juxtapositions;

means for determining the level of transition shift for each of said plurality of symbol cell juxtapositions;

means for reading data stored in a form of said symbol cells from said medium; and means for compensating said read data symbol cells for transition shift by varying the durtion of said symbol cells in accordance with said determined transition shift.

32. The system of claim 31 further comprising:

means for assigning a symbol cell duration to each of said N bit chunks wherein the more frequently a value occurs, the shorter is a time duration assigned to the symbol cell; and means for generating symbol cells for each N bit chunk in accordance with the symbol cell duration assigned thereto.

33. A system of storing data on a recording medium comprising:

means for grouping digital binary signals into chunks of N bits, where N is an integer greater than 1;

means for determining the value of each of said N bit chunks;

means for converting said N bit chunks to a corresponding symbol cell, each of said symbol cells having a duration which is dependent upon the value of the corresponding N bit chunks;

means for recording on a portion of said medium the relative symbol cell juxtapositions for at least two successive symbol cells;

means for determining from said recorded symbol cell juxtapositions the transition shift for each of said juxtapositions of symbol cells;

means for compensating said symbol cells for transition shift by varying the duration of said symbol cells;

means for recording on a portion of said magnetic media a plurality of relative symbol cell juxtapositions wherein said symbol cells are precompensated to reduce transition shift distortion;

means for recording the order in which said plurality of relative symbol cell juxtapositions are recorded;

means for reading from said medium the order in which said symbol cell juxtapositions are recorded and the plurality of symbol cell juxtapositions;

means for determining the level of transition shift for each of said plurality of said symbol cell juxtapositions;

means for reading data stored in the form of said symbol cells from said medium; and means for compensating said read data symbol cells for transition shift by varying the duration of said symbol cells in accordance with said determined transition shift.

34. A system for compensating for transition shift in a magnetic storage medium comprising the steps of:

means for recording on a portion of said magnetic medium a plurality of relative symbol cell juxtapositions wherein said symbol cells are precompensated to reduce transition shift distortion;

means for recording the order in which said plurality of relative symbol cell juxtapositions are recorded;

means for reading from said medium the order in which said symbol cell juxtapositions are recorded;

means for reading from said medium the plurality of symbol cell juxtapositions;

means for determining the level of transition shift for each of said plurality of symbol cell juxtapositions;

means for reading data stored in the form of said symbol cells from said medium; and means for compensating said read data symbol cells for transition shift by varying the duration of said symbol cells in accordance with said determined transition shift.

* * * * *